G. J. CHURCHWARD, G. H. BURROWS & C. C. CHAMPENEY.
STEAM SUPERHEATER.
APPLICATION FILED DEC. 3, 1909.
969,088.
Patented Aug. 30, 1910.
2 SHEETS—SHEET 1.
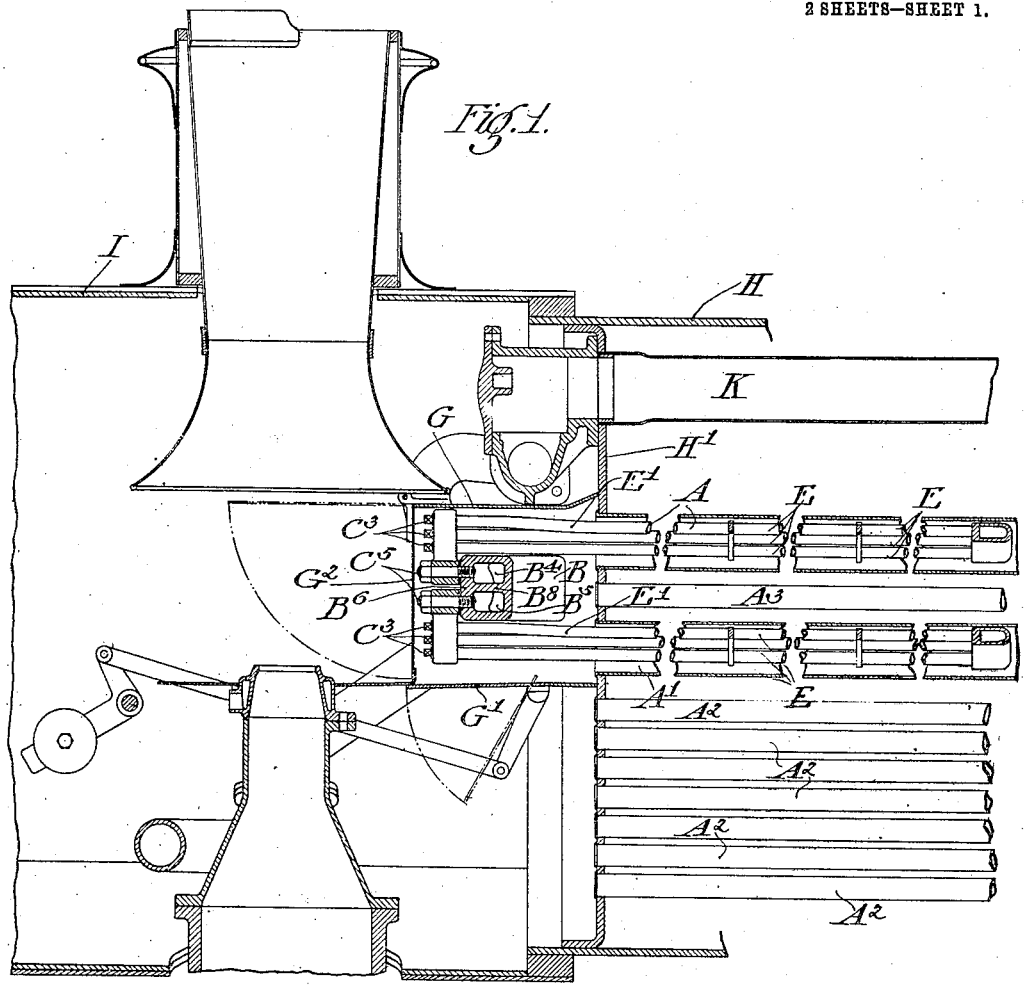
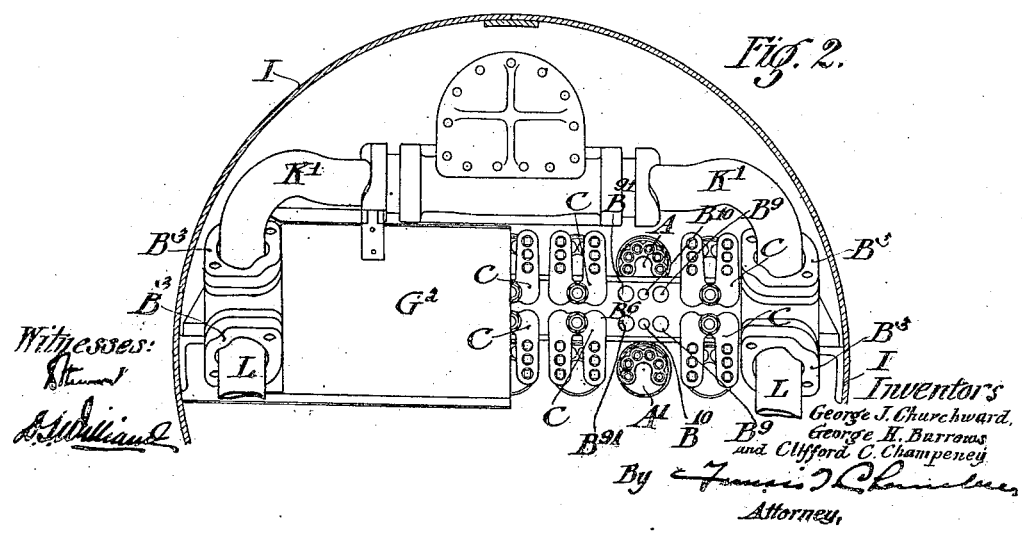

G. J. CHURCHWARD, G. H. BURROWS & C. C. CHAMPENEY.
STEAM SUPERHEATER.
APPLICATION FILED DEC. 3, 1909.
969,088.
Patented Aug. 30, 1910.
2 SHEETS—SHEET 2.
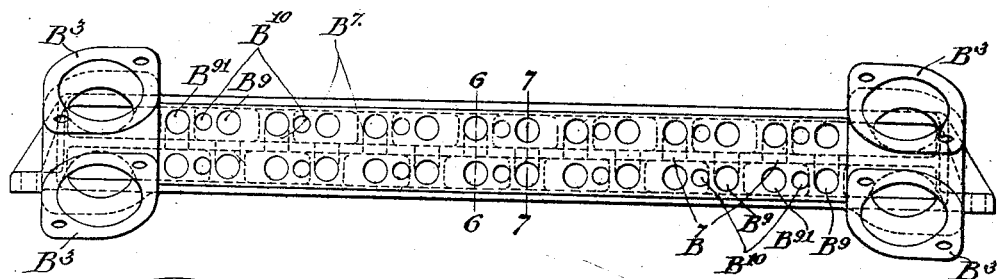
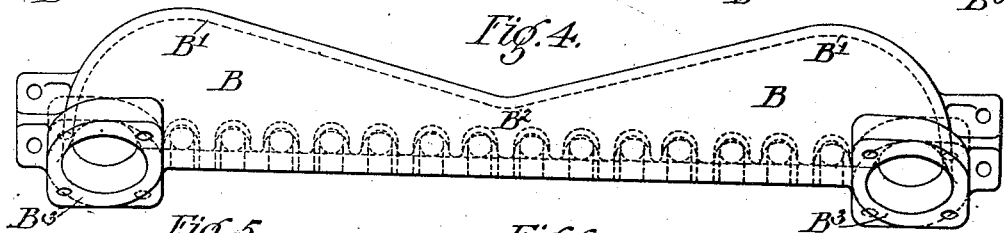
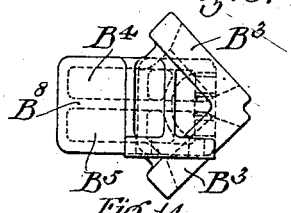
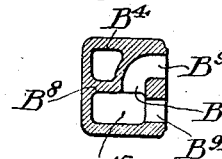
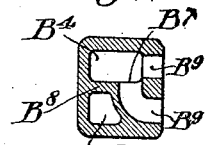
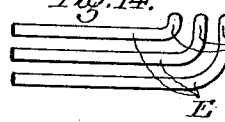
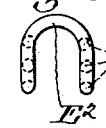
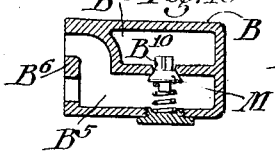
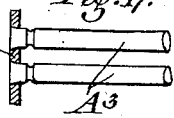
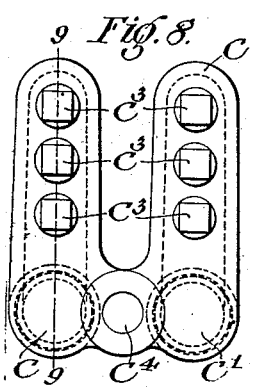
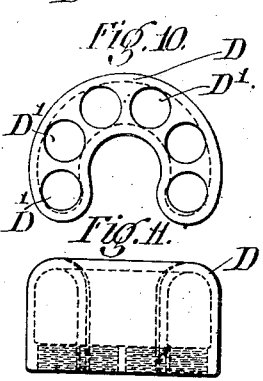
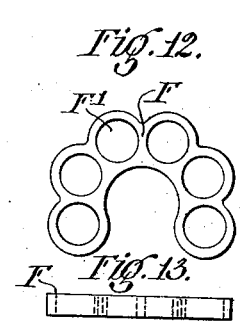
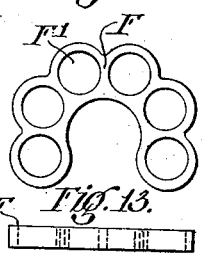
Witnesses:
Inventors:
George J. Churchward,
George H. Burrows
and Clifford C. Champeney
by
Attorney

UNITED STATES PATENT OFFICE.

GEORGE J. CHURCHWARD, GEORGE H. BURROWS, AND CLIFFORD C. CHAMPENEY, OF SWINDON, ENGLAND.

STEAM-SUPERHEATER.

969,088.

Specification of Letters Patent.   Patented Aug. 30, 1910.

Application filed December 3, 1909.  Serial No. 531,145.

*To all whom it may concern:*

Be it known that we, GEORGE J. CHURCHWARD, GEORGE H. BURROWS, and CLIFFORD C. CHAMPENEY, subjects of the King of Great Britain and Ireland, residing in Swindon, in the county of Wilts, England, have invented a certain new and useful Improvement in Steam-Superheaters, of which the following is a true and exact description, reference being had to the accompanying drawings, which form a part thereof.

The present invention relates to steam superheating appliances for tubular boilers especially those of the locomotive type.

More particularly the invention relates to superheaters of the general class or type known as "flue tube superheaters" in which the tubes within which the steam is superheated are located within enlarged flue tubes of a tubular steam boiler and provide channels through which steam passes from the steam space proper of the boiler to the tube or tubes through which it is delivered after being superheated to the engine cylinder or cylinders.

One main object of the invention is the production of a superheater of the kind specified which is simpler in form and more efficient in operation than those heretofore used and is so constructed and arranged at the smoke box end of the boiler as to give improved facility for cleaning the superheating tubes and the flues in which they are inserted.

A further object of the invention is to provide a construction characterized by the ease and simplicity with which a group of superheating tubes may be removed from the flue tube in which they are inserted without disturbing the groups of superheating tubes inserted in other flue tubes.

A further object of the invention is the provision of a simple and effective arrangement for keeping the velocity of the steam as nearly constant as possible in its passage through the superheater and in particular to insure substantially uniform distribution of the stream of steam through the various superheating tubes.

A further object of the invention is the provision of a structure in which the main superheating header or headers may be made short in depth, this we obtain by arranging each main header between rows of enlarged flue tubes and providing superheating connections to the header which lie some above and some below the header and enter the corresponding pair of rows of enlarged flue tubes.

The various features of novelty which characterize the present invention are pointed out with particularity in the claims annexed to and forming a part of this specification. For a better understanding of the invention, however, and the advantages possessed by it, reference should be had to the accompanying drawings and descriptive matter in which we have illustrated and described forms of apparatus embodying the invention.

Of the drawings, Figure 1 is a sectional elevation of a portion of a boiler provided with our improved superheating appliances. Fig. 2 is a partial end elevation of the boiler proper of Fig. 1 with the smoke box wall in section. Fig. 3 is a side elevation; Fig. 4 a plan view, and Fig. 5 an end elevation of the main steam header employed. Figs. 6 and 7 are sections through the main header on lines 6—6 and 7—7 respectively, of Fig. 3. Fig. 8 is an end elevation, on a larger scale than Fig. 2 of one of the U shaped supplementary header members. Fig. 9 is a section on the line 9—9 of Fig. 8. Fig. 10 is an elevation, and Fig. 11 a plan view of a device employed for connecting the ends of the superheating tubes inserted in a flue tube. Fig. 12 is an elevation, and Fig. 13 a plan view, of a tube spacing device. Fig. 14 is a side elevation of a portion of a group of superheating tubes employed in one form of the invention. Fig. 15 is an end elevation of the tubes shown in Fig. 14. Fig. 16 is a transverse section of the main steam header illustrating a valve arrangement which may be employed for connecting the saturated and superheated steam chambers under some conditions. Fig. 17 is a partial sectional elevation, taken similarly to Fig. 1, showing a modified arrangement of the smaller flue tubes.

In the form of apparatus embodying the invention illustrated in the drawings, H represents the cylindrical wall and H' an end wall of the boiler shell proper of a multitubular boiler of the locomotive type.

A and A' represent the enlarged flue tubes receiving the superheater tubes and arranged in the form shown in two horizontal rows.

$A^2$ represents the main flue tubes which are smaller in cross section than the tubes A and A', and $A^3$ represents tubes which may be similar to the tubes $A^2$ and are arranged between the two rows of tubes A and A'.

K represents the steam pipe leading from the steam space of the boiler. In the smoke box the pipe K is bifurcated, the branches K' leading to the connections $B^3$ at the ends of the main header B. The latter extends transversely to the flue tubes and is located between the two rows of tubes A and A'.

The header B is formed with an upper chamber $B^4$ for saturated steam in communication at its ends with the pipes K' and with a lower chamber $B^5$ for saturated steam in communication at its ends with the pipes L through which the superheated steam is conveyed to the engine cylinder or cylinders. As shown, the pipes L lead from the lower sides of the header end connections $B^3$. The chambers $B^4$ and $B^5$ are separated by the division wall $B^8$. The back wall $B^6$ of the header, that facing the smoke box door, is formed with ports $B^9$ and $B^{91}$ communicating with the saturated and superheated steam chambers $B^4$ and $B^5$ respectively. These ports are arranged in two horizontal rows and the ports $B^9$ and $B^{91}$ are disposed alternately in each row. The ports $B^9$ in the lower row are connected with the chamber $B^4$ by the curved passages $B^7$ and the ports $B^{91}$ in the upper row are connected with the chamber $B^5$ by similar passages $B^7$.

To obtain the desired uniformity of flow and at the same time to economize in the weight of material employed in the header and the space occupied, the header is shaped to give a decreased width, measured parallel to the length of the flue tubes, of the chambers $B^4$ and $B^5$ and a consequent decrease in the area of those chambers from the points B' where the steam first enters and finally leaves the header to the middle point $B^2$ of the header.

To the back wall $B^6$ of the main header B is connected a plurality of U shaped members or supplemental headers C in two rows, one row projecting upward and the other downward. Each leg of each member C is hollow and is provided in its front wall with an aperture C' through which, when the U shaped members are secured in position on the back wall of the header, over the two rows of apertures $B^9$ and $B^{91}$ communication is established between one leg of each member C and the saturated steam chamber $B^4$ and between the other leg of each member C and the superheated steam chamber $B^5$. The front wall of the legs of each U shaped member C is provided with a plurality of apertures $C^2$ for receiving the ends of a group of superheating tubes E, the back wall of the U shaped members has also a number of apertures coinciding with those in the front wall, these apertures being closed by screw plugs $C^3$.

Each U shaped member C is provided with an aperture $C^4$ near the bottom of the U whereby it is secured to the back wall of the header by a stud and nut $C^5$, the apertures $B^{10}$ in the back wall of the header being adapted to receive the various studs.

In each of the enlarged flue tubes A and A' of the boiler is placed a hollow horse shoe shaped member D having a plurality of apertures D' in its back walls into which the ends remote from the header of the tubes E of the corresponding group of superheating tubes are secured and placed in communication with each other.

The tubes E connected at one end to the two hollow legs of each U shaped member C, and at the other end to each other by the hollow end member D, form looped tubular connections between the legs, and each member C, the group of tubes E connected to it and the corresponding member D form a superheating unit separately secured to the main header. The bodies of the tubes E of each unit are in alinement with the apertures D' in the members D and consequently are disposed in cross section in the general form of a horse shoe shaped archway, and the lugs of the corresponding auxiliary header C are so spaced apart as to provide a passageway in line with said archway through which the cleaning device may be inserted into the corresponding flue tube.

The apertures in the front wall of each of the U shaped members C are not all in alinement with those of the corresponding horse shoe shaped members D, consequently some of the tubes have a slight set at E' in that portion outside the flue tube A or A' so as to bring them in line with the apertures $C^2$ in the member C.

Each group of superheating tubes E with the horse shoe shaped members D, when placed in the corresponding flue tubes A or A' leaves a space at the bottom of the flue tube admitting of the flue tube as well as the superheating tubes being readily cleaned.

In order that the plurality of superheating tubes E forming each group may be kept in position, a series of spacers in the form of horse shoe shaped pieces of plate F with apertures F' corresponding to the pitch of the superheating tubes are placed over the tubes in suitable positions; these plates also serve the purpose of retarding and mixing the gases of combustion, thereby increasing the efficiency of the superheater as a whole.

In cases of one or more of the superheating tubes E of a unit failing the unit can be readily removed by disconnecting the nut on the stud $C^5$ by which the member C of the unit is secured to the header B. The complete unit comprising the U shaped member C, the group of superheating tubes E with the horse shoe shaped members D and horse shoe shape pieces of plate F can then be removed to enable a blank plate to be secured to the header on the same stud $C^5$ over the two apertures $B^9$ and $B^{91}$ in the back wall uncovered by the removal of the member C thereby enabling the engine to work as usual with a group of superheating tubes out of use. Instead of employing the end members D the tubes E of each unit may be connected together in pairs by integral curves connecting portions $E^2$, as shown in Figs. 14 and 15.

While we have described one header having U shaped members projecting beyond the top and bottom walls and a row of flue tubes of enlarged diameter situated beyond the top and bottom walls of the header it is obvious that we may without departing from the scope of our invention employ more than one row of enlarged flue tubes in such positions. We may also employ more than one header, in which case they would be connected to each other in any suitable manner.

The portion of the superheater in the smoke box is inclosed in a casing G provided on its under part with a damper G' adapted to vary the proportion of gases drawn through the enlarged and ordinary flue tubes, covered by the casing, and the tubes of less diameter below the superheating casing whereby the degree of superheat may be varied. The front cover plate $G^2$ of the superheater is also hinged to enable it to be readily opened for cleaning and other purposes.

In order that the superheater may be efficient in supplying the requisite quantity of steam when the capacity of the groups of superheating tubes are temporarily reduced owing to one or more having been disconnected, or from other causes, we may place one or more valves over corresponding ports $B^{10}$ in the partition wall $B^8$ of the main header adapted to open to admit steam from the saturated into the superheated steam chamber on the pressure in the latter falling below that of the former, as shown in Fig. 16.

By the disposition of a row or rows of enlarged flue tubes A, A', on each side of a row or rows of ordinary or small flue tubes $A^3$ we are enabled to use a header or headers of comparatively short depth, or depths, thus insuring as near as possible an even draft through the rows of the enlarged flue tubes as well as the ordinary or small flue tubes, the ends of which are inclosed by the casing.

In order that we may utilize the heating surface of the superheating tubes in the enlarged flue tube A, A', to the best advantage we may reduce the diameter of the ends of the ordinary or small flue tube $A^3$ which are sandwiched between them, as indicated in Fig. 17, so as to reduce their area and cause more gases to pass through the enlarged flue tubes A, A'. The end members D and the spacers F serve also to retard and mix the gaseous products of combustion flowing through the enlarged flue tubes thereby increasing the efficiency of the superheater as a whole. Moreover, the construction shown by permitting the use of a comparatively large number of superheating tubes in each enlarged flue tube thereby reduces the volume of the central core of the products of combustion passing through the enlarged flues and this adds to the efficiency of the superheating provisions as a whole, since the heat is not effectively abstracted from such a central core. A further advantage in the use of ordinary or small tubes sandwiched between two or more rows of enlarged flue tubes is that the tube plates are not weakened to such an extent as when a number of rows of enlarged flue tubes are arranged in consecutive rows.

By the disposition of a row or rows of enlarged flue tubes on each side of a row or rows of ordinary or small flue tubes we are obviously enabled to use a header or headers of comparatively short depth or depths thus insuring as near as possible an even draft through the large flue tubes, as well as the ordinary or small flue tubes, the ends of which are inclosed by the casing.

By this construction of superheater we can readily employ a relatively large number of small diameter superheating tubes, in each enlarged flue tube, thereby increasing the efficiency as we reduce the area of the central core of steam which is not superheated to an appreciable extent with superheating tubes of comparatively large diameter.

Having now described our invention, what we claim as new, and desire to secure by Letters Patent, is:

1. The combination with a boiler provided with a plurality of enlarged flue tubes, of a superheater therefor comprising a main header extending transversely to said flue tubes at one end thereof and provided with a saturated steam chamber and with a superheated steam chamber, a series of hollow members in communication with one of said chambers, a second series of hollow members in communication with the other of said chambers, said hollow members being detachably connected to the wall of said header most remote from the ends of said tubes and projecting beyond the top and bottom walls of said header with the members of each series alternately disposed, and superheating tubes extending some above and some below said header and projecting into said enlarged flue tubes and connected to the various hollow members and to one another to provide looped tubular connections between each hollow member and an adjacent hollow member.

2. The combination with a boiler provided with a plurality of enlarged flue tubes, of a superheater therefor comprising a main header extending transversely to said flue tubes, at one end thereof, and provided with a saturated steam chamber and with a superheated steam chamber, a plurality of U shaped members detachably secured to the wall of said header most remote from the ends of said flue tubes and each having hollow legs, one of which is in communication with the saturated steam chamber, while the other is in communication with the superheated steam chamber, and a group of superheating tubes for each U shaped member which are connected at one end, some to one, and the others to the other, of the hollow legs of the member, and which are connected to each other at their ends remote from said member to thereby form looped tubular connections between said hollow legs, the superheating tubes connected to each U shaped member, all projecting into a single corresponding flue tube.

3. The combination with a boiler provided with a plurality of enlarged flue tubes, of a superheater therefor, comprising a main header extending transversely to said flue tubes, at one end thereof, and provided with a saturated steam chamber and with a superheated steam chamber, and a plurality of units, one for each of said enlarged flue tubes and each comprising a pair of hollow members, in communication, one with one, and the other with the other, of the chambers in said header, and a group of tubes which are connected at one end, some to one, and the others to the other, of said hollow members, and at the other end are connected to each other to provide looped tubular connections between the two hollow members adapted to be inserted in a single corresponding enlarged flue tube.

4. The combination with a boiler provided with a plurality of enlarged flue tubes, of a superheater therefor comprising a main header extending transversely to said flue tubes, at one end thereof, and provided with a saturated steam chamber and with a superheated steam chamber, and a plurality of units separately connected to the header, and each comprising a supplementary header detachably connected to the end wall of the main header most remote from said flue tubes and having a pair of hollow legs, one in communication with the one and the other in communication with the other of the chambers in said header, and a group of tubes which are connected at one end, some to one and the others to the other of said hollow legs, and which are connected at their ends to each other to provide looped tubular connections between the two hollow legs adapted to be inserted in a corresponding enlarged flue tube.

5. The combination with a boiler provided with a plurality of enlarged flue tubes, of a superheater therefor comprising a main header extending transversely to said flue tubes, at one end thereof, and formed with a flat and substantially vertical back wall and with elongated saturated and superheated steam chambers running lengthwise of the header and diminishing in width measured parallel to the length of the flue tubes from each end of the header toward the middle portion thereof, steam supply connections to the ends of the saturated steam chamber and steam outlets from the ends of the superheated steam chamber and superheating tubes forming looped tubular connections between said chambers detachably connected to the back wall of the header at intervals along the length thereof.

6. In a flue tube superheater the combination with saturated steam and superheated steam conduits, of one or more looped tubular connections between said conduits, each comprising a group of tube portions adapted to be inserted in a boiler flue tube and arranged in cross section in the form of a horse shoe shaped archway and hollow connections between said tube portions and conduits, said hollow connections being spaced apart to provide a passage way in line with said archway through which a cleaning device may be passed into the flue tube receiving said tube portions.

7. In a flue tube superheater, the combination with saturated steam and superheated steam conduits of a group of tube portions adapted to be inserted in a boiler flue tube, an end connection for the inserted ends of said tube portions in the form of a hollow horse shoe shaped member having apertures in one end wall receiving the ends of said tube portions and hollow connections by which some of said tube portions are connected with one and the remaining tube portions are connected with the other of said steam chambers, said hollow connections being spaced apart to provide a passage in line with said archway to permit a cleaning device to be inserted in the flue tube receiving said tube portions.

8. In a flue tube superheater, the combination with saturated steam and superheated steam conduits, of one or more looped tubular connections between said conduits, each comprising a group of tube portions adapted to be inserted in a boiler flue tube and arranged in cross section in the form of a horse shoe shaped archway, one or more horse shoe shaped spacer members adapted to engage said tube portions at a distance from their inserted ends to hold them in the desired relative positions, hollow connections between said tube portions and conduits, said hollow connections being spaced apart to provide a passage way in line with said archway through which a cleaning device may be passed into the flue tube receiving said tube portions.

9. In a flue tube superheater, the combination with saturated steam and superheated steam conduits of one or more looped tubular connections between said conduits, each comprising a group of tubes adapted to be inserted in a boiler flue tube and arranged in cross section in the form of a horse shoe shaped archway and a pair of hollow members connected one to one and the other to the other of said steam chambers, the outer ends of said inserted tubes being connected some to one and the remainder to the other of said hollow members and the latter being spaced apart to provide a passageway in line with said archway through which a cleaning device may be passed into the flue tube in which said group of tubes are inserted.

10. In a flue tube superheater, the combination with a main steam header formed with saturated steam and superheated steam chambers, of a U shaped member connected to said header and formed with hollow legs, one in communication with the saturated steam and the other in communication with the superheated steam chambers and a group of tubes connected to said hollow legs and connected to each other to form looped tubular connections between said hollow legs, said group of tubes being adapted to be inserted in a boiler flue tube and being arranged in cross section in the form of a horse shoe shaped archway to permit of cleaning devices to be passed into the flue tube in which said group of tubes may be inserted.

11. In a flue tube superheater, the combination of a main header provided with a saturated steam chamber and with a superheated steam chamber, of a plurality of units separately connected to said headers and each comprising a pair of hollow members, one in communication with one and the other in communication with the other of said members, and a group of tubes adapted to be inserted in a boiler flue tube and having their inserted ends connected together and their other ends connected, some to one and the remainder to the other of said hollow members with the portions of the tubes inserted in the flue tube arranged in cross section in the form of a horse shoe shaped archway and with the ends of the tubes connected to the hollow member arranged in two rows and the adjacent portions of some of the tubes correspondingly bent, said hollow members being spaced apart to provide a passage in line with said archway through which a cleaning device may be passed into flue tubes surrounding said group of tubes.

12. The combination with a boiler provided with a plurality of enlarged flue tubes arranged at different levels, of superheating provisions comprising a main steam header extending transversely to said flue tubes and above some and below others thereof, said header being formed with a saturated steam and a superheated steam chamber and being formed in its back wall with a plurality of ports arranged in two horizontal rows, with alternate ports in each row communicating with one and the other ports communicating with the other of said two chambers, a plurality of supplemental headers secured to said main header in two rows, one row comprising hollow legs projecting above the upper edge of the main header and the other hollow legs projecting below the lower edge of the header with the hollow legs in each row in communication, each with a corresponding port in the corresponding row of ports whereby each alternate leg is connected to one of said steam chambers and the intermediate legs are connected to the other steam chamber, and looped tubular connections connecting the hollow legs in each row together in pairs, and each tubular connection entering a corresponding enlarged flue tube.

13. The combination, with a boiler provided with a plurality of enlarged flue tubes arranged in two horizontal rows, of a plurality of smaller flue tubes arranged some between the two rows of enlarged flue tubes and some below the lower row of enlarged flue tubes, of superheating provisions comprising a main header extending transversely to the flue tubes between the upper and lower rows of enlarged flue tubes, and formed with saturated steam and superheated steam chambers, and looped tubular connections secured to said header and inserted in the enlarged flue tubes of each row, and each tubular connection connecting the two chambers thereof and being composed of a group of tubes inserted in a corresponding one of said enlarged flue tubes.

14. The combination, with a boiler provided with a plurality of enlarged flue tubes arranged in two horizontal rows, and a plurality of smaller flue tubes arranged partly between and partly below the lower of said rows, of superheating provisions comprising a main steam header extending transversely to the flue tubes between the upper and lower rows of enlarged flue tubes and formed with saturated steam and superheated steam chambers and having formed in its back wall a plurality of ports arranged in two horizontal rows, each formed alternately of ports communicating with one and ports communicating with the other of said two chambers, a plurality of U shaped members secured to said header in two rows, one with the legs projecting above the upper edge of the header and the other with the legs projecting below the lower edge of the header, and each having its legs hollow and in communication one with a port running to one of said chambers and the other with a port running to the other of said chambers, and a looped tubular connection between the hollow legs of each U shaped member formed of a group of tubes connected at one end, some to one and some to the other of said legs and connected at the other end to each other and adapted to be inserted in a corresponding enlarged flue tube.

GEORGE J. CHURCHWARD.
GEORGE H. BURROWS.
CLIFFORD C. CHAMPENEY.

Witnesses:
JAMES F. TANKIN,
E. J. FUSSELL.